United States Patent
Chupeau et al.

(10) Patent No.: US 12,212,784 B2
(45) Date of Patent: Jan. 28, 2025

(54) DIFFERENT ATLAS PACKINGS FOR VOLUMETRIC VIDEO

(71) Applicant: INTERDIGITAL CE PATENT HOLDINGS, SAS, Paris (FR)

(72) Inventors: Bertrand Chupeau, Rennes (FR); Renaud Dore, Rennes (FR); Franck Thudor, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 39 days.

(21) Appl. No.: 17/916,367

(22) PCT Filed: Apr. 1, 2021

(86) PCT No.: PCT/EP2021/058716
§ 371 (c)(1),
(2) Date: Sep. 30, 2022

(87) PCT Pub. No.: WO2021/204700
PCT Pub. Date: Oct. 14, 2021

(65) Prior Publication Data
US 2023/0224501 A1  Jul. 13, 2023

(30) Foreign Application Priority Data
Apr. 7, 2020 (EP) .................... 20315127

(51) Int. Cl.
*H04N 19/70* (2014.01)
*G06T 3/16* (2024.01)
(52) U.S. Cl.
CPC .............. *H04N 19/70* (2014.11); *G06T 3/16* (2024.01)

(58) Field of Classification Search
CPC ........ G06T 3/16; H04N 19/46; H04N 19/597; H04N 19/70; H04N 21/2353; H04N 21/816; H04N 21/85406
(Continued)

(56) References Cited

U.S. PATENT DOCUMENTS

2019/0373278 A1* 12/2019 Castaneda ............ H04N 19/172
2019/0378333 A1* 12/2019 Castaneda ............... G06T 7/251
(Continued)

FOREIGN PATENT DOCUMENTS

EP  3349182 A1 * 7/2018 ............. G06T 17/00
EP  3568834 A1  11/2019

OTHER PUBLICATIONS

Anonymous, "Information Technology—Coded Representation of Immersive Media—Part 5: Video-based Point Cloud Compression", International Organization for Standardization, Document: ISO/IEC 23090-5:2018(E), Geneva, Switzerland, 2018, 141 pages.
(Continued)

*Primary Examiner* — Kathleen M Walsh
(74) *Attorney, Agent, or Firm* — Condo Roccia Koptiw LLP (57) ABSTRACT

Methods, devices and stream are disclosed to encode and decode a scene (such as a point cloud) in the context of a patch-based transmission of a volumetric video content. Attributes of points of the scene are projected onto patches. Every point has a geometry attribute. For other attributes, like transparency of displacement attribute, some points may have no value. According to the present principles, each attribute is encoded in a different atlas with its own layout. This allow to save pixel rate in memory of the renderer.

18 Claims, 4 Drawing Sheets

(58) Field of Classification Search
USPC .................................................. 375/240.08
See application file for complete search history.

(56) References Cited

U.S. PATENT DOCUMENTS

| | | | |
|---|---|---|---|
| 2021/0067757 A1* | 3/2021 | Yun ...................... | H04N 13/282 |
| 2023/0156229 A1* | 5/2023 | Boyce .................. | H04N 19/117 |
| | | | 375/240.02 |
| 2023/0179797 A1* | 6/2023 | Hayashi .................. | G06T 17/00 |
| | | | 375/240.12 |

OTHER PUBLICATIONS

Boyce et al., "Candidate MIV specification text", International Organization for Standardization, ICoding of Moving Pictures and Audio, ISO/IEC JTC1/SC29/WG11, Document: MPEG2019/M52821, Brussels, Belgium, Jan. 2020, 58 pages.

* cited by examiner

DIFFERENT ATLAS PACKINGS FOR VOLUMETRIC VIDEO

CROSS REFERENCE TO RELATED APPLICATIONS

This application is a U.S. National Stage Application under 35 U.S.C. § 371 of International Patent Application No. PCT/EP2021/058716, filed Apr. 1, 2021, which is incorporated herein by reference in its entirety.

This application claims the benefit of European Patent Application No. 20315127.9, filed Apr. 7, 2020.

TECHNICAL FIELD

The present principles generally relate to the domain of three-dimensional (3D) scenes and volumetric video content. The present document is also understood in the context of the encoding, the formatting and the decoding of data representative of attributes of points of a 3D scene for a rendering of volumetric content on end-user devices such as mobile devices or Head-Mounted Displays (HMD).

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Recently there has been a growth of available large field-of-view content (up to 360°). Such content is potentially not fully visible by a user watching the content on immersive display devices such as Head Mounted Displays, smart glasses, PC screens, tablets, smartphones and the like. That means that at a given moment, a user may only be viewing a part of the content. However, a user can typically navigate within the content by various means such as head movement, mouse movement, touch screen, voice and the like. It is typically desirable to encode and decode this content.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

A large field-of-view content may be, among others, a three-dimension computer graphic imagery scene (3D CGI scene), a point cloud or an immersive video. Many terms might be used to design such immersive videos: Virtual Reality (VR), 360, panoramic, 4π steradians, immersive, omnidirectional or large field of view for example.

Volumetric video (also known as 6 Degrees of Freedom (6DoF) video) is an alternative to 3DoF video. When watching a 6DoF video, in addition to rotations, the user can also translate his head, and even his body, within the watched content and experience parallax and even volumes. Such videos considerably increase the feeling of immersion and the perception of the scene depth and prevent from dizziness by providing consistent visual feedback during head translations. The content is created by the means of dedicated sensors allowing the simultaneous recording of color and depth of the scene of interest. The use of rig of color cameras combined with photogrammetry techniques is a way to perform such a recording, even if technical difficulties remain.

While 3DoF videos comprise a sequence of images resulting from the un-mapping of texture images (e.g. spherical images encoded according to latitude/longitude projection mapping or equirectangular projection mapping), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation within the video content whereas a second one (aka. 3DoF+) restricts the user viewing space to a limited volume called viewing bounding box, allowing limited translation of the head and parallax experience. This second context is a valuable trade-off between free navigation and passive viewing conditions of a seated audience member.

In a 3DoF+ scenario, an approach consists in sending only the geometry and color information needed to watch the 3D scene from any point of the viewing bounding box. Another approach considers sending additional information, that is, in addition to the color attribute, other attributes of points of the 3D scene, visible or not from the viewing bounding box, but useful to perform higher quality viewport rendering or other process at the decoder side like relighting, collision detection or haptic interactions. This additional information may be conveyed in the same format than color attributes of pixels of the maps resulting from projections of points of the 3D scene. However, every point of the 3D scene does not share the same number of attributes. For instance, it is not needed to transmit a transparency attribute for every point of the scene as a huge majority of points have a default transparency value (i.e. opaque value). Other attributes may be more diffuse and not require a fine resolution of projection maps. Thus, there is a need for a format and methods to carry every attribute representative of points of a 3D scene while limiting the bit rate and the pixel rate of the encoded, transmitted and decoded bitstream.

SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method comprising decoding, from a data stream, a first image, a second image and associated metadata. The metadata comprise a list of data items. A data item comprises:
 a location and a size of a region of the first image corresponding to a current patch. A patch is a picture encoding a projection of a part of points of a 3D scene;
 a flag indicating whether the current patch is present in the second image; and on condition that the flag indicates the presence of the current patch in the second image, a location of a region of the second image corresponding to the current patch.

In an embodiment, pixels of the first image encode a first attribute of a part of points of the 3D scene and pixels of the second images encode a second attribute of the same part of the 3D scene. First attribute is different from second attribute.

In another embodiment, pixels of first and second images are inverse projected according to the decoded metadata to generate a 3D scene and generating viewport images to render the volumetric content from a point of view within the 3D scene.

The present principles also relate to a device comprising a processor configured to implement the steps of the method above.

The present principles also relate to a data stream encoded according the method above.

The present principles also relate to a method comprising:
obtaining a set of first and second patches. A first patch is encoding a projection of a first attribute of a part of points of a 3D scene; a second patch is encoding a projection of the first attribute and a second attribute of a part of points of the 3D scene;
encoding the first attribute in a first image by packing first and second patches of the set in the first image and encoding the second attribute in a second image by packing second patches of the set in the second image;
generating a data stream comprising the first image, the second image and associated metadata.

Metadata comprise, for a current patch of the set of patches:
a location and a size of a region of the first image corresponding to the current patch;
a flag indicating whether the current patch is a second patch; and
on condition that the current patch is a second patch, a location of a region of the second image corresponding to the current patch.

The present principles also relate to a device comprising a processor configured to implement the steps of the method above.

BRIEF DESCRIPTION OF THE DRAWINGS

The present disclosure will be better understood, and other specific features and advantages will emerge upon reading the following description, the description making reference to the annexed drawings wherein.

DETAILED DESCRIPTION

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

Figure 1:
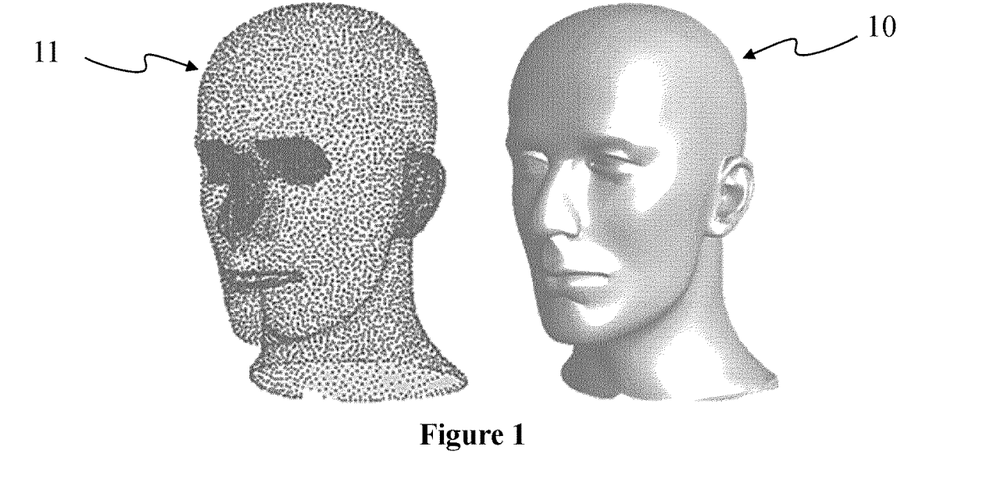
FIG. 1 shows a three-dimension (3D) model of an object and points of a point cloud corresponding to the 3D model, according to a non-limiting embodiment of the present principles.

FIG. 1 shows a three-dimension (3D) model 10 of an object and points of a point cloud 11 corresponding to 3D model 10. 3D model 10 and the point cloud 11 may for example correspond to a possible 3D representation of an object of the 3D scene comprising other objects. Model 10 may be a 3D mesh representation and points of point cloud 11 may be the vertices of the mesh. Points of point cloud 11 may also be points spread on the surface of faces of the mesh. Model 10 may also be represented as a splatted version of point cloud 11, the surface of model 10 being created by splatting the points of the point cloud 11. Model 10 may be represented by a lot of different representations such as voxels or splines. FIG. 1 illustrates the fact that a point cloud may be defined with a surface representation of a 3D object and that a surface representation of a 3D object may be generated from a point of cloud. As used herein, projecting points of a 3D object (by extension points of a 3D scene) onto an image is equivalent to projecting any representation of this 3D object, for example a point cloud, a mesh, a spline model or a voxel model.

A point cloud may be represented in memory, for instance, as a vector-based structure, wherein each point has its own coordinates in the frame of reference of a viewpoint (e.g. three-dimensional coordinates XYZ, or a solid angle and a distance (also called depth) from/to the viewpoint) and one or more attributes, also called component. An example of component is the color component that may be expressed in various color spaces, for example RGB (Red, Green and Blue) or YUV (Y being the luma component and UV two chrominance components). The point cloud is a representation of a 3D scene comprising objects. The 3D scene may be seen from a given viewpoint or a range of viewpoints. The point cloud may be obtained by many ways, e.g.:
- from a capture of a real object shot by a rig of cameras, optionally complemented by depth active sensing device;
- from a capture of a virtual/synthetic object shot by a rig of virtual cameras in a modelling tool;
- from a mix of both real and virtual objects.

Figure 2:
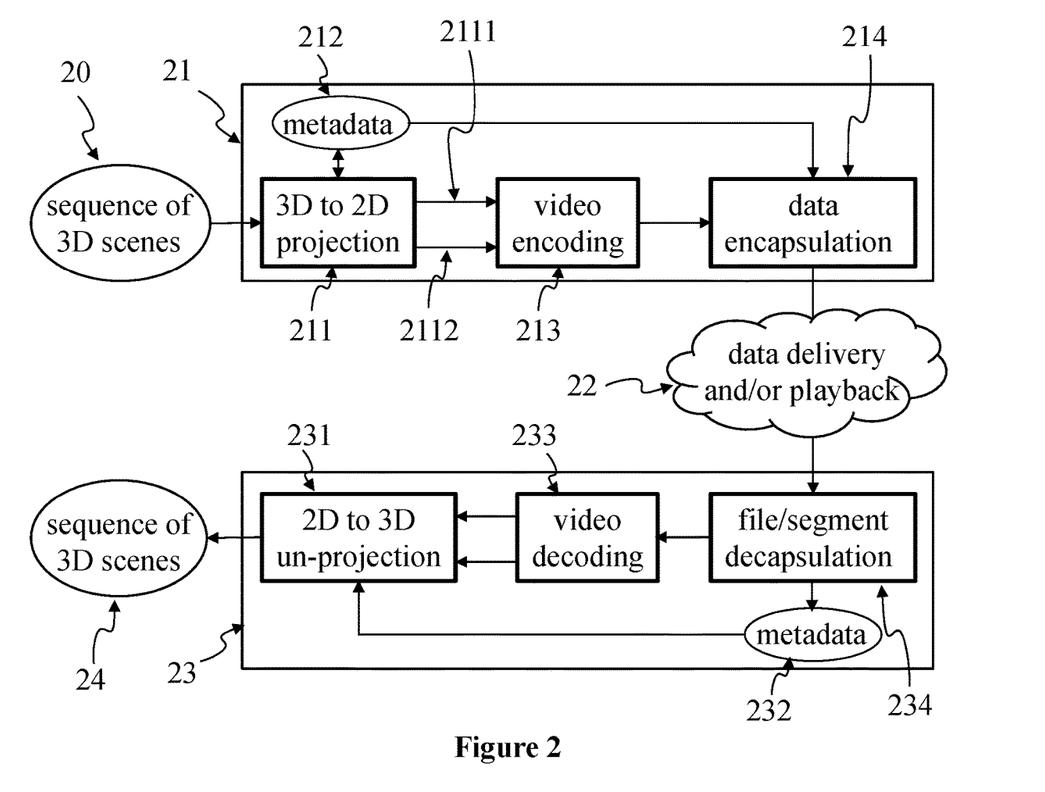
FIG. 2 shows a non-limitative example of the encoding, transmission and decoding of data representative of a sequence of 3D scenes, according to a non-limiting embodiment of the present principles.

FIG. 2 shows a non-limitative example of the encoding, transmission and decoding of data representative of a sequence of 3D scenes. The encoding format that may be, for example and at the same time, compatible for 3DoF, 3DoF+ and 6DoF decoding.

A sequence of 3D scenes 20 is obtained. As a sequence of pictures is a 2D video, a sequence of 3D scenes is a 3D (also called volumetric) video. A sequence of 3D scenes may be provided to a volumetric video rendering device for a 3DoF, 3DoF+ or 6DoF rendering and displaying.

Sequence of 3D scenes 20 is provided to an encoder 21. The encoder 21 takes one 3D scenes or a sequence of 3D scenes as input and provides a bit stream representative of the input. The bit stream may be stored in a memory 22 and/or on an electronic data medium and may be transmitted over a network 22. The bit stream representative of a sequence of 3D scenes may be read from a memory 22 and/or received from a network 22 by a decoder 23. Decoder 23 is inputted by said bit stream and provides a sequence of 3D scenes, for instance in a point cloud format.

Encoder 21 may comprise several circuits implementing several steps. In a first step, encoder 21 projects each 3D scene onto at least one 2D picture. 3D projection is any method of mapping three-dimensional points to a two-dimensional plane. As most current methods for displaying graphical data are based on planar (pixel information from several bit planes) two-dimensional media, the use of this type of projection is widespread, especially in computer graphics, engineering and drafting. Projection circuit 211 provides at least one two-dimensional frame 2111 for a 3D scene of sequence 20. Frame 2111 comprises color information and depth information representative of the 3D scene projected onto frame 2111. In a variant, color information and depth information are encoded in two separate frames 2111 and 2112. In an embodiment, points of the 3D scene carry more than geometry and color attributes. For instance, a point of the scene may have a normal attribute, a transparency attribute, a diffuse or specular reflection attribute. Other attributes, not directly linked to the location and color of a point may be a part of the 3D model of the scene, for example a semantic attribute associating a point with an object (e.g. character, tree, wall, floor, etc.) or a part of an object (e.g. head, arm, leaf, etc.). In this embodiment, these attributes are projected onto several frames, a frame per attribute, or in a variant, in one frame with pixels having several attributes.

Metadata 212 are used and updated by projection circuit 211. Metadata 212 comprise information about the projection operation (e.g. projection parameters) and about the way color and depth information is organized within frames 2111 and 2112 as described in relation to FIGS. 5 to 7.

A video encoding circuit 213 encodes sequence of frames 2111 and 2112 as a video. Pictures of a 3D scene 2111 and 2112 (or a sequence of pictures of the 3D scene) is encoded in a stream by video encoder 213. Then video data and metadata 212 are encapsulated in a data stream by a data encapsulation circuit 214.

Encoder 213 is for example compliant with an encoder such as:
- JPEG, specification ISO/CEI 10918-1 UIT-T Recommendation T.81, https://www.itu.int/recfT-REC-T.81/en;
- AVC, also named MPEG-4 AVC or h264. Specified in both UIT-T H.264 and ISO/CEI MPEG-4 Part 10 (ISO/CEI 14496-10), http://www.itu.int/recIT-REC-H.264/en, HEVC (its specification is found at the ITU website, T recommendation, H series, h265, http://www.itu.int/rec/T-REC-H.265-201612-I/en);

3D-HEVC (an extension of HEVC whose specification is found at the ITU website, T recommendation, H series, h265, http://www.itu.int/recfT-REC-H.265-201612-1/en annex G and I);

VP9 developed by Google; or

AV1 (AOMedia Video 1) developed by Alliance for Open Media.

The data stream is stored in a memory that is accessible, for example through a network 22, by a decoder 23. Decoder 23 comprises different circuits implementing different steps of the decoding. Decoder 23 takes a data stream generated by an encoder 21 as an input and provides a sequence of 3D scenes 24 to be rendered and displayed by a volumetric video display device, like a Head-Mounted Device (HMD). Decoder 23 obtains the stream from a source 22. For example, source 22 belongs to a set comprising:

- a local memory, e.g. a video memory or a RAM (or Random-Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 23 comprises a circuit 234 for extract data encoded in the data stream. Circuit 234 takes a data stream as input and provides metadata 232 corresponding to metadata 212 encoded in the stream and a two-dimensional video. The video is decoded by a video decoder 233 which provides a sequence of frames. Decoded frames comprise color and depth information. In a variant, video decoder 233 provides two sequences of frames, one comprising color information, the other comprising depth information. In an embodiment, other attributes than depth and color are encoded in frames. In this embodiment, pixels of a frame have more than two components. In a variant of this embodiment, video decoder 233 provides more than two sequences of frames, one per attribute. A circuit 231 uses metadata 232 to inverse project color and depth information from decoded frames to provide a sequence of 3D scenes 24. Sequence of 3D scenes 24 corresponds to sequence of 3D scenes 20, with a possible loss of precision related to the encoding as a 2D video and to the video compression.

Other circuits and functionalities may be added, for instance before the inverse projection step by circuit 231 or in a post-processing step after the inverse projection. For instance, circuits may be added for relighting of the scene from another light located anywhere in the scene. Collision detection may be performed for depth compositing, like adding a new object into the 3DoF+ scene in a consistent realistic way or for path planning. Such circuit may require geometry and/or color information about the 3D scene that is not to be used for the 3DoF+ rendering itself. The semantics of the different kinds of information has to be indicated the bit-stream representative of the 3DoF+ scene.

Figure 3:
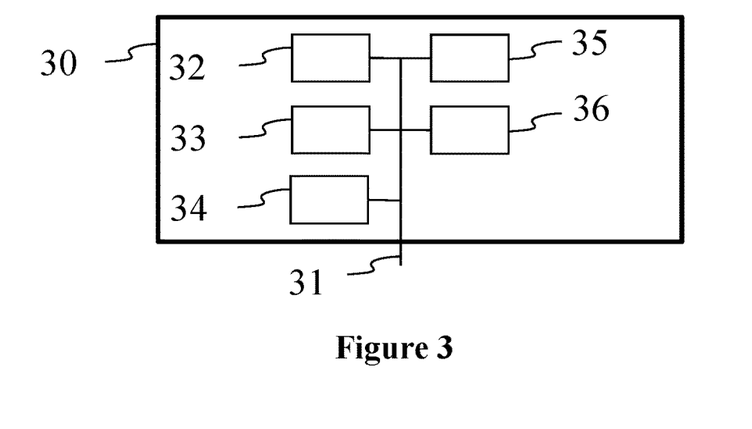
FIG. 3 shows an example architecture of a device which may be configured to implement a method described in relation with FIGS. 8 and 9, according to a non-limiting embodiment of the present principles.
Figure 8:
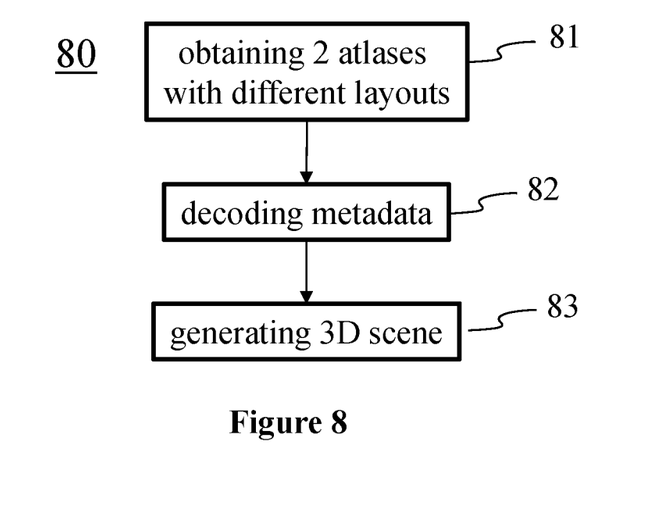
FIG. 8 illustrates a method 80 for decoding a data stream representative of a volumetric content, according to a non-limiting embodiment of the present principles.
Figure 9:
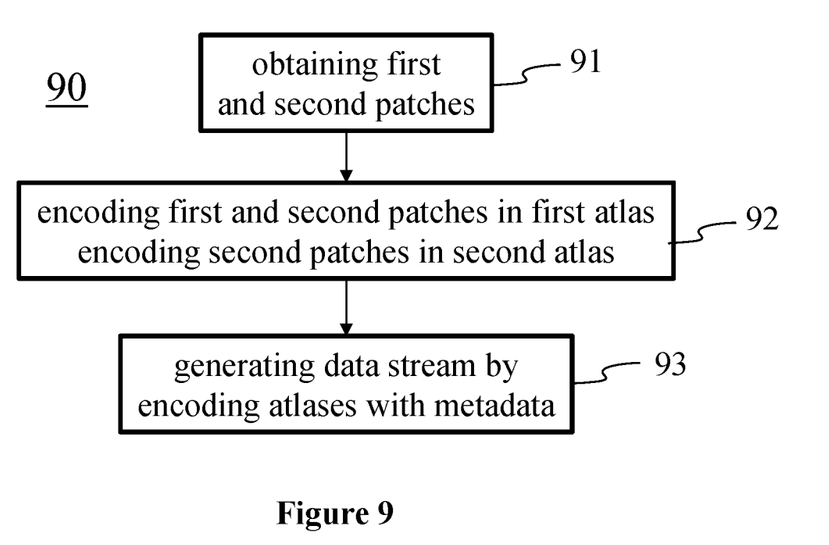
FIG. 9 illustrates a method 90 for encoding a volumetric content in a data stream, according to a non-limiting embodiment of the present principles.

FIG. 3 shows an example architecture of a device 30 which may be configured to implement a method described in relation with FIGS. 8 and 9. Encoder 21 and/or decoder 23 of FIG. 2 may implement this architecture. Alternatively, each circuit of encoder 21 and/or decoder 23 may be a device according to the architecture of FIG. 3, linked together, for instance, via their bus 31 and/or via I/O interface 36.

Device 30 comprises following elements that are linked together by a data and address bus 31:

- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word <<register>> used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with FIGS. 8 and 9, and belongs to a set comprising:

- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

Figure 4:
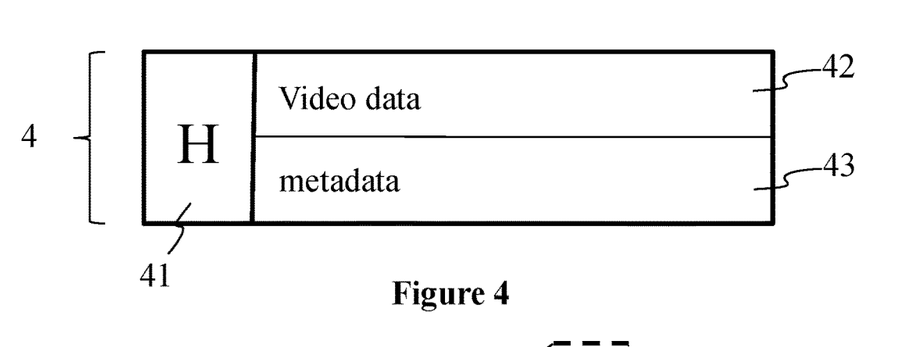
FIG. 4 shows an example of an embodiment of the syntax of a stream when the data are transmitted over a packet-based transmission protocol, according to a non-limiting embodiment of the present principles.

FIG. 4 shows an example of an embodiment of the syntax of a stream when the data are transmitted over a packet-based transmission protocol. FIG. 4 shows an example structure 4 of a volumetric video stream. The structure consists in a container which organizes the stream in independent elements of syntax. The structure may comprise a header part 41 which is a set of data common to every syntax elements of the stream. For example, the header part comprises some of metadata about syntax elements, describing the nature and the role of each of them. The header part may also comprise a part of metadata 212 of FIG. 2, for instance the coordinates of a central point of view used for projecting points of a 3D scene onto frames 2111 and 2112. The structure comprises a payload comprising an element of syntax 42 and at least one element of syntax 43. Syntax element 42 comprises data representative of the depth frames and, if there are other attributes, the different attribute frames (e.g. color, normal, transparency, specular, etc.). Images may have been compressed according to a video compression method.

Element of syntax 43 is a part of the payload of the data stream and may comprise metadata about how frames of element of syntax 42 are encoded, for instance parameters used for projecting and packing points of a 3D scene onto frames. Such metadata may be associated with each frame of the video or to group of frames (also known as Group of Pictures (GoP) in video compression standards).

Figure 5:
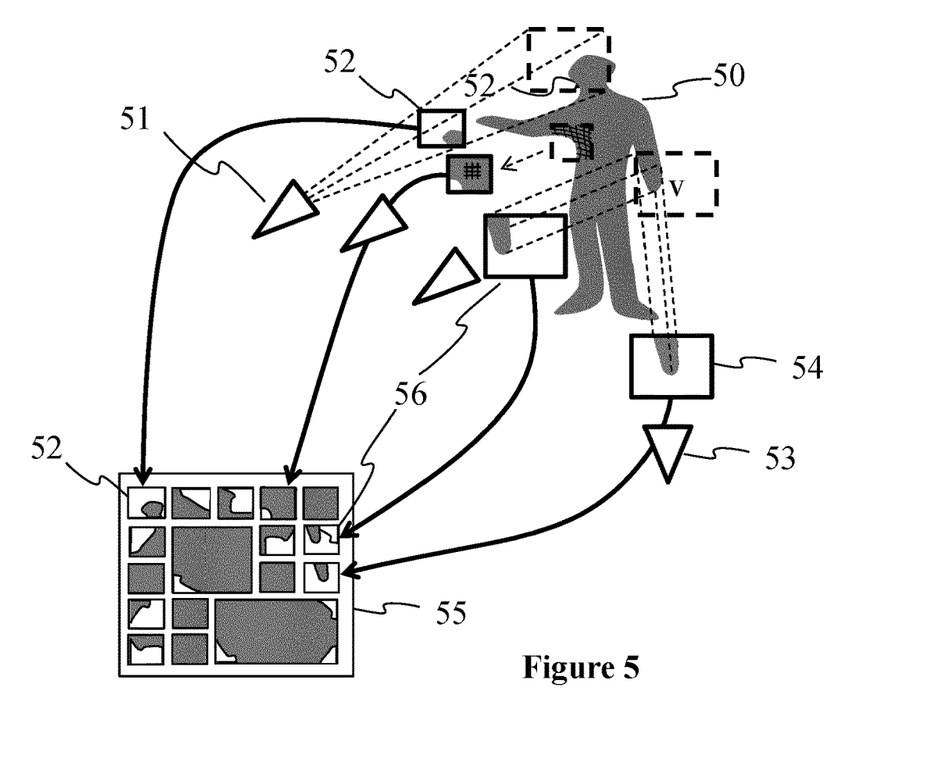
FIG. 5 illustrates the patch atlas approach with an example of 4 projection centers, according to a non-limiting embodiment of the present principles.

FIG. 5 illustrates the patch atlas approach with an example of 4 projection centers. 3D scene 50 comprises a character. For instance, center of projection 51 is a perspective camera and camera 53 is an orthographic camera. Cameras may also be omnidirectional cameras with, for instance a spherical mapping (e.g. Equi-Rectangular mapping) or a cube mapping. The 3D points of the 3D scene are projected onto the 2D planes associated with virtual cameras located at the projection centers, according to a projection operation described in projection data of metadata. In the example of FIG. 5, projection of the points captured by camera 51 is mapped onto patch 52 according to a perspective mapping and projection of the points captured by camera 53 is mapped onto patch 54 according to an orthographic mapping. Pixels of a patch comprises at least a geometry attribute, typically a depth attribute (i.e. a quantization of the distance between a center of projection and the projected point). Pixels of patches may also store other attributes, for example color of the projected point or texture coordinates or transparency, etc.

A clustering of the pixels is performed and yields a multiplicity of 2D patches, which are packed in a rectangular atlas 55. The organization of patches within the atlas defines the atlas layout. In an embodiment, pixels of the atlas (that is pixels of every patch packed in the atlas) comprise as many components as there are point attributes projected onto the projection maps. In another embodiment, the patch atlas approach generates as may atlases as there are point attributes projected onto the projection maps. In both embodiments, a geometry attribute is projected (e.g. a depth value or 3D coordinates). A geometry attribute is required for inverse projecting (also called inverse projecting) pixels of atlases. Every point of the 3D scene has at least a geometry attribute. Other attributes may be attributed to a part of the points of the 3D scene only. Even color attribute may be attributed to a part of points only, for instance in a medical application where a body has no specific color (i.e. a default color), but one studied organ. Other attributes like transparency may concern only a part of the points of the 3D scene. In the second embodiment, every atlases has the same atlas layout and share the same metadata as detailed below. Two patches captured by a same camera or by two distinct cameras may comprise information representative of a same part of the 3D scene, like, for instance patches 54 and 56.

The packing operation produces a patch data item for each generated patch. A patch data item comprises a reference to a projection data (e.g. an index in a table of projection data or a pointer (i.e. address in memory or in a data stream) to a projection data) and information describing the location and the size of the patch within the atlas (e.g. top left corner coordinates, size and width in pixels). Patch data items are added to metadata to be encapsulated in the data stream in association with the compressed data of the one, two or more atlases.

In the state of the art, for a given number of projected attributes, the same number of atlases with a same layout is generated. For instance, for two attributes A and B, a set of patches is obtained, for example, according to the method described above. In case of two attributes A and B, two categories of patches may be distinguished. Pixels of first patches store a value for attribute A and no value (or a default value that can be omitted as it is predetermined) for attribute B. Pixels of second patches store a value for both attributes A and B. An existing method creates a first atlas image encoding first attribute A, the first atlas packing every patch of the set and a second atlas image encoding second attribute B, the second atlas having the same size than the first atlas and packing only second patches at the same location, orientation and size than they are packed in the first atlas. Thus, the second atlas is partially empty: at every location where there is a first patch in the first atlas, there are pixels with no value (i.e. a default value, for instance 0) at the same location in the second atlas. Large rectangles of pixels with a same value may be easily compressed and slightly increase the bit rate of the generated stream. So, there is a difference between the pixel rate (i.e. the size of the image in raw pixels (width×height) that the GPU can manage per unit of time) and the bit rate (i.e. the size of the image in bits, after compression). However, the pixel rate, that is the memory space and access at the renderer side is twice the size of an atlas image multiplied by the sum of the bit-depth of the two attributes (i.e. the number of bits required to encode the values of each attribute). The pixel rate is multiplied by the number of attributes. For attributes attributed to a small number of points of the scene (e.g. transparency), this very high pixel rate is a useless consumption of memory and processor resources.

Figure 6:
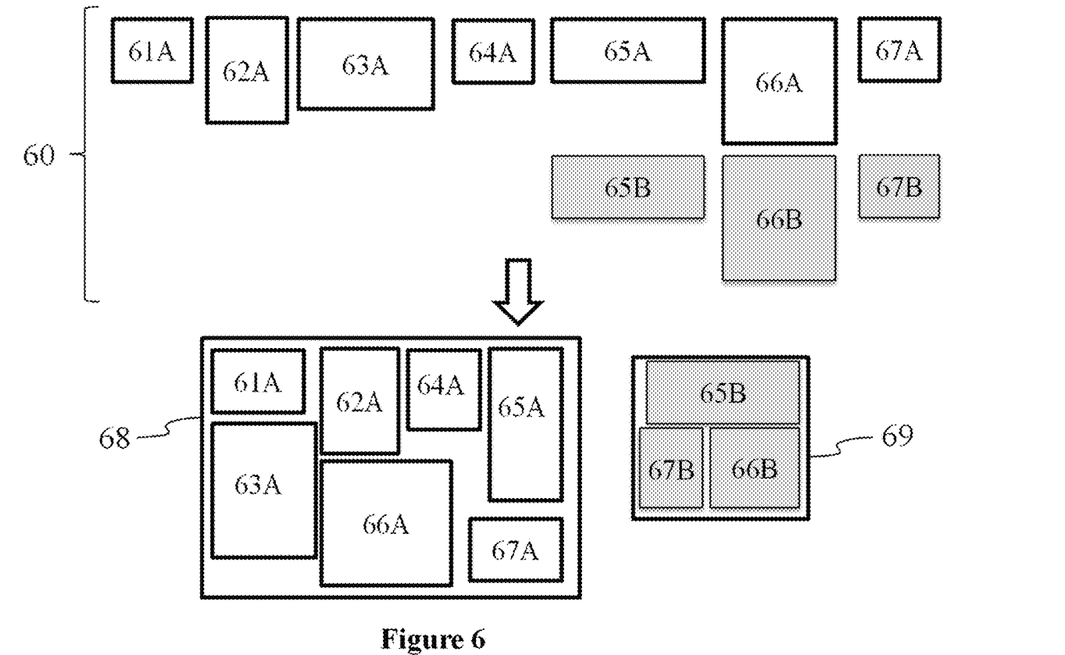
FIG. 6 illustrates the generation of atlases for a set of patches storing one or two attributes, according to a non-limiting embodiment of the present principles.

FIG. 6 illustrates the generation of atlases for a set 60 of patches 61 to 67 storing one or two attributes. The present principles propose a format for encoding atlas images and associated metadata to decrease the required bit rate and pixel rate of the data stream representative of the volumetric scene. According to the present principles, at least two attributes A and B of points of the scene are projected onto projection maps and clustered into patches. A set 60 of patches is obtained. In set 60, second patches 65(A and B) to 67(A and B) store, in their pixels, two values, one for attribute A (65A to 67A) and one for attribute B (65B to 67B). First patches 61A to 64A only store values for attribute A (61A to 64A) and no value for attribute B. According to the present principles, a first atlas 68 is generated by packing pixels storing attribute A of every patch 61A to 67(A and B). The packing step organizes patches 61(A) to 67(A and B) in order to minimize the non-used area of atlas 68. For this, rectangles of patches are organized according to a layout. They may be oriented in different directions from their original orientation in obtained set 60. The location, size and orientation of each patch is encoded in metadata associated to atlas 68. According to the present principles, a second atlas 69 is generated by packing pixels of second patches storing attribute B 65B to 67B only. Second patches may be located at different coordinates than in atlas 68, be oriented in different directions. As, second patches is a subset of set 60 of patches, the size in pixels (=width×height) of atlas 69 is smaller than the size in pixels of atlas 68. In a variant, patches of set 60 may be rescaled when packing. According to the present principles, patches packed in first atlas 68 may have a different scale than same patches in second atlas 69. In the example of FIG. 6, patch 66A is not rescaled for its attribute A in first atlas 68 and is downscaled for its attribute B in second atlas 69.

In a variant, a third category of patches may be set up; pixels of third patches storing a value for attribute B and no value (or a default value) for attribute A. This variant is not developed in the present application. Hereinbefore, a geometry attribute (attribute A) is mandatory and this category of patches does not occur in the context of the present principles.

In other variants, more than two attributes of points of the scene are projected. For three attributes A, B and C, four categories are determined: (A), (A, B), (A, C), (A, B, C). According to the present principles, a first atlas is generated packing the four categories of patches (every patches storing attribute A), a second atlas is generated packing second and fourth patches (for attribute B) and a third atlas is generated packing third and fourth patches (for attribute C); each of these three atlases having its own atlas layout. The present principles may be applied to any number of attributes without lost of generality. For four attributes, eight categories may be identified for generating four atlases, etc.

Metadata associated with the generated list of atlases must be representative of the different layouts of the atlases. A possible syntax to signal a specific packing per attribute may be the following syntax.

A miv_atlas_sequence_vparams(vuh_atlas_id) element describes the atlas parameters applicable to the entire sequence, for each attribute. In particular, the three following syntax elements—atlas frame horizontal and vertical dimensions and flag enabling patch scaling—are parameters, distinct for each attribute, which are related to the described method.

masp_attr_frame_width_minus1[i1]+1 and masp_attr_frame_height_minus1[i]+1 specify the dimensions of the atlas for the i-th attribute.

masp_attribute_per_patch_scale_enable[i] is a binary flag enabling the patch scaling in the atlas for the i-th attribute.

|  | Descriptor |
|---|---|
| miv_atlas_sequence_params( vuh_atlas_id ) { |  |
|   if( vuh_atlas_id == 0 ) |  |
|     masp_omaf_v1_compatible_flag | u(1) |
|   masp_group_id | u(v) |
|   masp_auxiliary_atlas_flag | u(1) |
|   masp_depth_occ_map_threshold_flag | u(1) |
|   if( msp_geometry_scale_enabled_flag == 1 ) { |  |
|     masp_geometry_frame_width_minus1 | u(v) |
|     masp_geometry_frame_height_minus1 | u(v) |
|   } |  |
|   for( i = 0; i <= ai_attribute_count[ vuh_atlas_id ]; i++ ) { |  |
|     masp_attr_frame_width_minus1[ i ] | u(16) |
|     masp_attr_frame_height_minus1[ i ] | u(16) |
|     masp_attribute_per_patch_scale_enable[ i ] | u(1) |
|   } |  |
| } |  |

A patch_data_unit(p) syntax structure for the patch with index p describes how the patch is packed in the patch atlas, for each attribute, including geometry: more precisely, it specifies its presence and if present its location and size.

Syntax elements pdu_2d_pos_x[p] and pdu_2d_pos_y[p] are set into pdu_geo_atlas_pos_x[p] and pdu_geo_atlas_pos_[p] respectively, to indicate that they specify the location of the top-left corner of the patch in the geometry atlas only.

Syntax elements pdu_2d_size_x_minus1[p] and pdu_2d_size_y_minus1[p] specify the patch size in the source view with index equal to pdu_view_id[p] and in the geometry atlas only (and no more in the attribute atlases) for each attribute with index i:

pdu_attr_atlas_present_flag[p][i] is a binary flag indicating if the patch is present in the atlas of the i-th attribute     pdu_attr_atlas_pos_x[p][i] and pdu_attr_atlas_pos_y[p][i] specify the location of the top-left corner of the patch in the atlas of the i-th attribute     pdu_attr_atlas_orientation_idx[p][i] indicates the patch orientation index in the atlas of the i-th attribute     pdu_attr_atlas_size_x_minus1[p][i]+1 and pdu_attr_atlas_size_y_minus1[p][i]+1 specify the size of the patch in the atlas of the i-th attribute

|  | Descriptor |
|---|---|
| patch_data_unit( p ) { |  |
|   pdu_geo_atlas_pos_x[ p ]/ * new semantics for pdu_2d_pos_x */ | ue(v) |
|   pdu_geo_atlas_pos_y[ p ]/* new semantics for pdu_2d_pos_y */ | ue(v) |
|   pdu_2d_size_x_minus1[ p ] /* new semantics */ | ue(v) |
|   pdu_2d_size_y_minus1[ p ] /* new semantics */ | ue(v) |
|   pdu_view_pos_x[ p ] | u(v) |
|   pdu_view_pos_y[ p ] | u(v) |
|   pdu_depth_start[ p ] | u(v) |
|   if( asps_normal_axis_max_delta_value_enabled_flag ) |  |
|     pdu_depth_end[ p ] | u(v) |
|   pdu_view_id[ p ] | u(v) |
|   pdu_orientation_index[ p ] | u(v) |
|   if( afps_lod_mode_enabled_flag ) { |  |
|     pdu_lod_enabled_flag[ p ] | u(1) |
|     if( pdu_lod_enabled_flag[ p ] > 0 ) { |  |
|       pdu_lod_scale_x_minus1[ p ] | ue(v) |
|       pdu_lod_scale_y[ p ] | ue(v) |
|     } |  |
|   } |  |
|   if( asps_point_local_reconstruction_enabled_flag ) |  |
|     point_local_reconstruction_data( patchIdx ) |  |
|   if( vps_miv_extension_flag ) { |  |
|     if( msp_max_entities_minus1 > 0 ) |  |
|       pdu_entity_id[ p ] | u(v) |
|     if(masp_depth_occ_map_threshold_flag) |  |
|       pdu_depth_occ_map_threshold[ p ] | u(v) |
|     for( i = 0; i <= ai_attribute_count[ vuh_atlas_id ]; i++ ) { |  |
|       pdu_attr_atlas_present_flag[ p ][ i ] | u(1) |
|       if( pdu_attr_atlas_present_flag[ p ][ i ] == 1 ) { |  |
|         pdu_attr_atlas_pos_x[ p ][ i ] | ue(v) |
|         pdu_attr_atlas_pos_y[ p ][ i ] | ue(v) |
|         pdu_attr_atlas_orientation_idx[ p ][ i ] | u(v) |
|         if (masp_attribute_per_patch_scale_enable_flag[ i ] ) { |  |
|           pdu_attr_atlas_size_x_minus1[ p ][ i ] | ue(v) |
|           pdu_attr_atlas_size_y_minus1[ p ][ i ] | ue(v) |
|         } |  |
|       } |  |
|     } |  |
|   } |  |
| } |  |

Figure 7:
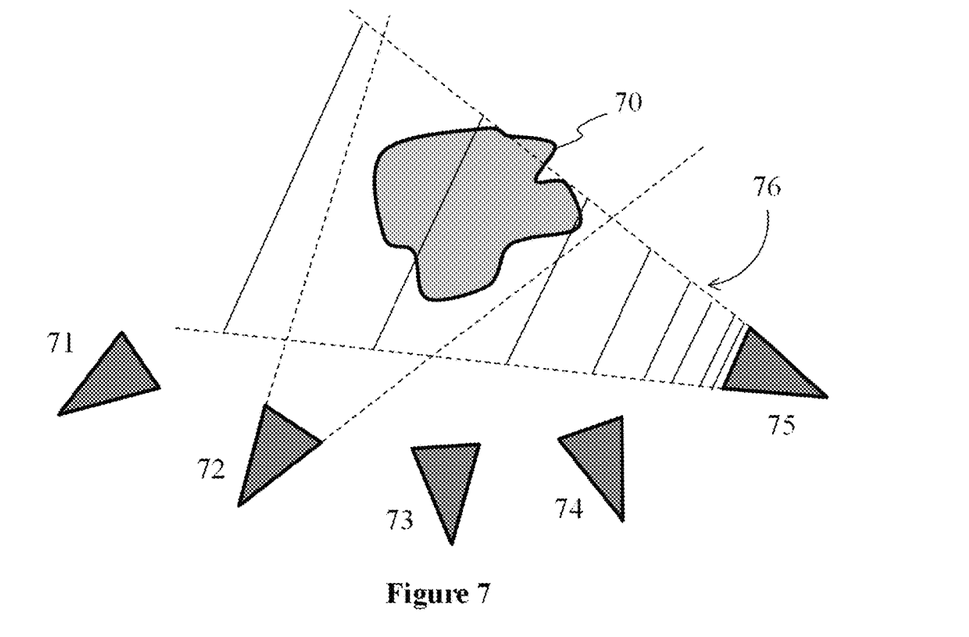
FIG. 7 illustrates the determining of the displacement attribute according to a non-limiting embodiment of the present principles.

FIG. 7 illustrates the determining of the displacement attribute according to a non-limiting embodiment of the present principles. There are some cases where the depth conveyed by the geometry attribute of atlases is insufficient. In fact, most of the video coding implementations operate on 10 bits—although a video coding profile exists for more depth bits—and this leads to depth quantization errors which are sensitive when the configuration of the view camera rig is not confined to a small area.

FIG. 7 illustrates the case of a scene 70 captured by projection of cameras 71 to 75 aiming inward to the scene center, and therefore with their frustum crossing each other. This volumetric content is expected to be consumed the same way, i.e. with a user looking roughly at the same place and in the same direction of views 71 to 75. Potentially, a user at position of the camera 72 will look at some information conveyed by the view 75 seen in profile. However, the depth quantization law 76 of views in volumetric content is typically based on a 1/z law designed to minimize the depth quantization error close to the original camera as illustrated by straight parallel progressively away from the view 75 camera. It is not expected to see the depth conveyed by 75 seen in profile by 72. This will lead to very visible artefacts at contour. To overcome this problem, a solution is to allocate more bits to depth.

According to the present principles, the depth geometry information is kept with a normal bit depth (e.g. 8 or 10 or 16 bits) quantized by the 1/z law, while complementing it with a depth quantized by a uniform coding for expressing the small difference between the effective coded depth and the targeted fine depth. This "displacement attribute" may be determined according to the following steps:

From the real metric depth Zmetric(scene), quantizing the geometry information with the 1/z law: Zquantized (scene);

the quantized depth conveyed to the decoder side is determined by making abstraction of depth coding error Zquantized(scene));

value Zrecovered_metric(Zquantized(scene)) is obtained with the dual operation which is compared to the real metric depth;

This small difference Zmetric(scene)–Zrecovered_metric (Zquantized(scene)) is coded, for example, in gray scale in parallel in an extended attribute, typically with a linear quantization law. It is necessary to add a few metadata to derive the metric value from the quantized linear value, for example the metric value of the quantization unity.

This "displacement attribute" only operates a small displacement of the depth conveyed by the geometry information of the first atlas. Geometry information of the first atlas represents the Most Significant Bits, while the displacement attribute represents the Least Significant Bits. Displacement is also a term used in graphics engineering to apply a small geometry deformation to a mesh geometry in certain shaders.

In a preferred embodiment, patches carrying the displacement attribute are not downscaled. It is relevant to apply this adjustment to those patches whose rendering artefacts would be very visible without this depth adjustment, typically the patch of foreground objects. Such an attribute is well designed to be conveyed into a specific atlas according to the present principles.

FIG. 8 illustrates a method 80 for decoding a data stream representative of a volumetric content, according to a non-limiting embodiment of the present principles. At a step 81, a first and a second atlas are decoded from the stream. They may be of different sizes. Pixels of first and second atlas store values representative of an attribute of points of the volumetric content. In an embodiment, pixels of the first atlas encode a first attribute and pixels of the second atlas encode a second attribute different from the first attribute. At a step 82, metadata associated with the two atlases are decoded from the data stream. The metadata comprise a list of data items, a data item comprising:

a location and a size of a region of the first atlas corresponding to a current patch; a patch encoding a projection of a part of points of the 3D scene of the volumetric content;

a flag indicating whether the current patch is present in the second atlas; and on condition that the flag indicates the presence of the current patch in the second atlas, a location of a region of the second atlas corresponding to the current patch.

In an embodiment, the decoded atlases and the metadata may be used to generate the 3D scene of the volumetric content at a step 83 by inverse projecting pixels of the two atlases according to the present principles.

FIG. 9 illustrates a method 90 for encoding a volumetric content in a data stream, according to a non-limiting embodiment of the present principles. At a step 91, a set of patches is obtained from a source. A patch is a picture encoding a projection of a part of points of the 3D scene of the volumetric content. The set of patches comprise first patches encoding a projection of a first attribute of a part of points of a 3D scene and second patches encoding a projection of the first attribute and of a second attribute of a part of points of the 3D scene of the volumetric content. At a step 92, a first atlas image is generated by packing first and second patches of the set and a second atlas image is generated by packing second patches. At a step 93, the data stream is generated. The data stream comprises the first image, the second image and associated metadata comprising, for a current patch of the set of patches:

a location and a size of a region of said first image corresponding to the current patch;

a flag indicating whether the current patch is a second patch; and on condition that the current patch is a second patch, a location of a region of said second image corresponding to the current patch.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising obtaining, from a data stream, a first image packing first patches, a second image packing second patches, and associated metadata, the metadata comprising a list of data items, wherein a data item comprises:
   a first location and a size of a region of the first image corresponding to a current first patch, wherein the first patch encodes a projection of a part of points of a 3D scene;
   an information indicating whether a second patch corresponding to the current first patch is present in the second image; and
   on a condition that the information indicates the presence of the second patch in the second image, the metadata comprises a second location of a region of the second image corresponding to the second patch;
the method further comprising, for a data item of the list of patch data items:
   decoding the first patch at the first location and of the size in the first image; and
   on a condition that the information indicates the presence of the second patch in the second image, decoding the second patch at the second location and of the size in the second image.

2. The method of claim 1, wherein the first patch present in the first image encodes a first attribute of a part of points of the 3D scene onto patches and if the second patch is present in the second image, the second patch encodes a second attribute of the part of points of the 3D scene, the first attribute being different from the second attribute.

3. The method of claim 1, wherein the data item comprises projection information for the current first patch and wherein first patches of the first image encode a geometry attribute, the method further comprising:
   generating a 3D scene according to decoded first and second patches.

4. A device comprising a processor configured for decoding, from a data stream, a first image packing first patches, a second image packing second patches, and associated metadata, the metadata comprising a list of data items, wherein a data item comprises:
   a first location and a size of a region of the first image corresponding to a current first patch, wherein a first patch encodes a projection of a part of points of a 3D scene;
   an information indicating whether a second patch corresponding to the current first patch is present in the second image; and
   on a condition that the information indicates the presence of the second patch in the second image, the metadata comprises a second location of a region of the second image corresponding to the second patch;
the processor further configured for, for a data item of the list of patch data items:
   decoding a first patch at the first location and of the size in the first image; and
   on a condition that the information indicates the presence of the second patch in the second image, decoding the second patch at the second location and of the size in the second image.

5. The device of claim 4, wherein the first patch present in the first image encodes a first attribute of a part of points of the 3D scene onto patches and if the second patch is present in the second image, the second patch encodes a second attribute of the part of points of the 3D scene, the first attribute being different from the second attribute.

6. The device of claim 4, wherein the data item comprises projection information for the current patch and wherein patches of the first image encode a geometry attribute, the processor being further configured for generating a 3D scene according to decoded first and second patches.

7. A method comprising:
   obtaining a set of first and second patches, a first patch encoding a projection of a first attribute of a part of points of a 3D scene, a second patch encoding a projection of the first attribute and a second attribute of the part of points of the 3D scene;

packing first patches in a first image and packing second patches in a second image; and generating a data stream comprising the first image, the second image, and associated metadata, wherein the metadata comprises, for a current first patch:

a first location and a size of a region of the first image corresponding to the current first patch;

an information indicating whether a second patch corresponds to the current first patch; and if so, adding a second location of a region of the second image corresponding to the second patch to the metadata.

8. The method of claim 7, wherein the first attribute is different from the second attribute.

9. The method of claim 7, wherein the first attribute is a geometry attribute.

10. A device comprising a processor configured for:

obtaining a set of first and second patches, a first patch encoding a projection of a first attribute of a part of points of a 3D scene, a second patch encoding a projection of the first attribute and a second attribute of the part of points of the 3D scene;

packing first patches in a first image and packing second patches of in a second image; and generating a data stream comprising the first image, the second image, and associated metadata, wherein the metadata comprises, for a current first patch:

a first location and a size of a region of the first image corresponding to the current first patch;

an information indicating whether a second patch corresponds to the current first patch; and if so, adding a second location of a region of the second image corresponding to the second patch to the metadata.

11. The device of claim 10, wherein the first attribute is different from the second attribute.

12. The device of claim 10, wherein the first attribute is a geometry attribute.

13. A non-transitory computer readable storage medium storing instructions, which, when executed by one or more processors, perform the method of claim 1.

14. A non-transitory computer readable storage medium storing instructions, which, when executed by one or more processors, perform the method of claim 7.

15. A non-transitory computer readable storage medium storing:

a first image packing first patches;

a second image packing second patches; and associated metadata comprising a list of data items, wherein a data item comprises:

a first location and a size of a region of the first image corresponding to a current first patch, wherein the first patch encodes a projection of a part of points of a 3D scene;

an information indicating whether a second patch corresponding to the current first patch is present in the second image; and on a condition that the information indicates the presence of the second patch in the second image, the metadata comprises a second location of a region of the second image corresponding to the second patch.

16. The non-transitory computer readable storage medium of claim 15, wherein the first patch present in the first image encodes a first attribute of a part of points of the 3D scene onto patches and if the second patch is present in the second image, the second patch encodes a second attribute of the part of points of the 3D scene.

17. The non-transitory computer readable storage medium of claim 16, wherein the first attribute is different from the second attribute.

18. The non-transitory computer readable storage medium of claim 16, wherein the first attribute is a geometry attribute.

* * * * *